United States Patent
Praisner et al.

(10) Patent No.: US 7,150,427 B1
(45) Date of Patent: Dec. 19, 2006

(54) BOUNDARY LAYER TRANSITION MODEL

(75) Inventors: Thomas J. Praisner, Colchester, CT (US); John P. Clark, Dayton, OH (US)

(73) Assignee: United Technologies Corporation, Hartford, CT (US)

( * ) Notice: Subject to any disclaimer, the term of this patent is extended or adjusted under 35 U.S.C. 154(b) by 330 days.

(21) Appl. No.: 10/921,786

(22) Filed: Aug. 18, 2004

Related U.S. Application Data

(60) Provisional application No. 60/496,190, filed on Aug. 18, 2003.

(51) Int. Cl.
*G01M 9/00* (2006.01)

(52) U.S. Cl. ............... 244/1 R; 244/34 R; 73/147; 73/432.1

(58) Field of Classification Search ............ 244/1 R, 244/34 R, 123.1; 73/147, 432.1
See application file for complete search history.

(56) References Cited

U.S. PATENT DOCUMENTS

| | | | |
|---|---|---|---|
| 4,188,823 A | * | 2/1980 | Hood ............... 73/147 |
| 4,848,153 A | * | 7/1989 | Stack et al. ............ 73/432.1 |
| 4,896,532 A | * | 1/1990 | Schmalz ............... 73/147 |
| 5,538,201 A | * | 7/1996 | Gerhardt ............... 244/204 |
| 6,138,955 A | * | 10/2000 | Gutmark et al. ......... 244/204.1 |

OTHER PUBLICATIONS

Robert Edward Mayle, The Role of Laminar-Turbulent Transition in Gas Turbine Engines, Journal of Turbomachinery, Oct. 1991, pp. 509-537, vol. 113.

B.J. Abu-Ghannam et al., Natural Transition of Boundary Layers—the Effects of Turbulence, Pressure Gradient, and Flow History, Journal Mechanical Engineering Science, 1980, pp. 213-228, vol. 22.

* cited by examiner

*Primary Examiner*—Robert P. Swiatek
(74) *Attorney, Agent, or Firm*—Bachman & LaPointe, P.C.

(57) ABSTRACT

In the computational fluid dynamics analysis of airfoils, a laminar/turbulent transition location is determined by consideration of a turbulence length scale in addition to a turbulence intensity. In an exemplary implementation, the transition is predicted as occurring when a momentum thickness-based Reynolds number reaches a given exponent of the factor multiplied by a constant. The factor may consist of the turbulence intensity multiplied by a momentum thickness and divided by the turbulence length scale.

10 Claims, 2 Drawing Sheets

BOUNDARY LAYER TRANSITION MODEL

CROSS-REFERENCE TO RELATED APPLICATIONS

Benefit is claimed of U.S. Patent Application Ser. No. 60/496,190, filed Aug. 18, 2003 and entitled "Boundary Layer Transition Model".

BACKGROUND OF THE INVENTION

The invention relates to computational fluid dynamics (CFD). More particularly, the invention relates to the design of airfoils for turbomachinery.

Many turbomachines feature sections characterized by alternating circular arrays (often referred to as "rows") of airfoils. Alternating, oppositely-oriented, rows of rotating blade and fixed vane airfoils may be present in any given section. Performance of the turbomachine is influenced by the size, positioning, and shape of these airfoils. CFD means are commonly used to optimize parameters for desired performance (e.g., efficiency) in desired operating conditions. The behavior of boundary layers, especially on the suction sides of the airfoils, strongly influences airfoil performance. The boundary layer will start as a laminar flow and then typically transition to a turbulent flow. The boundary layer may also separate from the airfoil. The separated boundary layer may then reattach.

Standard practice in the industry is to perform CFD simulations solving the Reynolds Average Navier-Stokes equations with a two-equation turbulence model. The turbulence model is disabled in the laminar portion of the boundary layer. Thus one must know: (a) the location of the boundary between the boundary layer and freestream; and (b) the location on the airfoil at which the boundary layer transitions from laminar to turbulent flow. The former is straightforward and may be done by analyzing the flowfield resulting from a converged CFD solution, which used either fully laminar or fully turbulent models. The latter is more difficult.

It has long been known that freestream turbulence plays a key role in determining the location of the boundary layer transition. A relationship between a critical momentum thickness-based Reynolds number on the one hand and the freestream turbulence intensity and a pressure gradient parameter on the other hand is disclosed in Abu-Ghannam B. J., Shaw R., Natural Transition of Boundary Layers—the Effects of Turbulence, Pressure Gradients and Flow History",. J. Mech. Eng Sci., Vol. 22, pp. 213–228, 1980. A relationship between that critical Reynolds number and the freestream turbulence intensity is disclosed in Mayle, R. E., "The Role of Laminar-Turbulent Transition in Gas Turbine Engines", ASME Journal of Turbomachinery, Vol. 113, pp. 509–537, 1991. Nevertheless there is room for further improvement in transition modeling.

SUMMARY OF THE INVENTION

Accordingly, one aspect of the invention involves a method for analyzing performance of an airfoil. A freestream turbulence intensity, a momentum thickness, and a turbulence length scale are determined. Based upon these parameters, a momentum thickness Reynolds number associated with a laminar/turbulent boundary transition is determined. The Reynolds number is associated with a location along the airfoil.

In various implementations, the Reynolds number may essentially be determined based on a function of the freestream turbulence intensity multiplied by the momentum thickness and divided by the turbulence length scale. The function may essentially be an exponent multiplied by a constant. The constant may be 7.0–11.0 and the exponent may be –(0.8–1.1).

Another aspect of the invention involves a method for engineering an airfoil. A freestream turbulence intensity and turbulence length scale are determined. Based upon the freestream turbulence intensity and the turbulence length scale a momentum thickness Reynolds number associated with an estimated laminar/turbulent boundary transition is determined. The Reynolds number is associated with a location along the airfoil.

In various implementations, an estimated laminar/turbulent transition may occur at the location. The method may include running a CFD simulation of the airfoil with a turbulence model turned off in a boundary layer essentially upstream of the location. The method may be iteratively performed on successive versions of the airfoil with associated variations in shape so as to optimize performance parameters of such airfoil.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

A missing element from prior transition modeling is the turbulence length scale $\lambda_X$ which may be measured at the boundary layer edge. We have determined that this parameter, along with the turbulence intensity and momentum thickness, may be used to predict the transition from laminar to turbulent conditions.

At any given streamwise location, the momentum thickness-based Reynolds number may be identified as:

$$Re_\theta = \frac{\theta \rho U_\infty}{\mu}$$

where $\theta$ is the momentum thickness at such location, $\rho$ is the density at the boundary layer edge at such location, $U_\infty$ is the U velocity at the boundary layer edge at such location, and $\mu$ is the viscosity at the boundary layer edge at such location. The turbulence intensity may be identified as:

$$Tu = 100(u'/U_\infty)$$

where u' is calculated or measured at the boundary layer edge at such location.

With the foregoing in mind, we have found that transition occurs when $Re_\theta$ reaches a critical value $Re_{\theta onset}$ which may be identified as:

$$Re_{\theta onset} = A\left(\frac{Tu\theta}{\lambda_x}\right)^B$$

for a variety of turbulence models where A and B are constants that may be associated with a particular model. In one implementation of the k-omega model, A=8.52 and B=−0.956. For any given turbulence model the constants may determined by substituting in experimental laboratory data from at least two distinct operating conditions.

Figure 1:
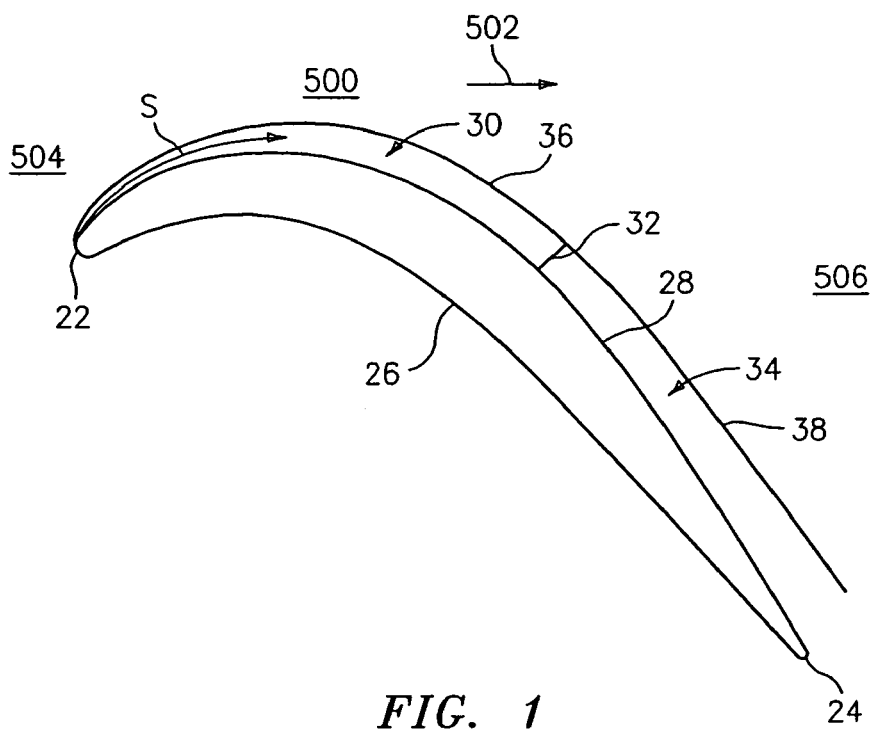
FIG. 1 is a schematic sectional view of an airfoil in a flowfield.

The forgoing transition model may be applied to modeling the attached-flow performance of an airfoil 20 (FIG. 1) and optimizing the shape of such airfoil for a desired operating condition or range of conditions. The airfoil 20 has a leading edge 22 and a trailing edge 24 and pressure and suction side surfaces 26 and 28. The airfoil is located in a flowfield 500 having a generally downstream direction 502. The boundary layer may extend aft along each of the surfaces 26 and 28. Typically, boundary layer modeling is critical on the suction side 28 and is often ignored on the pressure side 26. Although discussed below with respect to the suction side, the principles of the invention may also be applied to pressure side modeling. A laminar upstream portion 30 of the suction side boundary layer extends downstream from a stagnation point at the leading edge 22. A transition location 32 divides the laminar portion from a downstream turbulent portion 34. The boundary layer edge or boundary has associated upstream and downstream portions 36 and 38 in the laminar and turbulent regions. A streamwise distance S is shown along the suction side measured downstream from the leading edge stagnation point.

In an exemplary CFD implementation, the input conditions at locations 504 upstream of the airfoil are known or assumed. For example, for the first airfoil row in a high pressure turbine, these conditions may be known from measurement or modeling of the engine combustor at a target operating condition. For subsequent rows, the upstream conditions may be taken from the conditions at downstream locations 506 of the row thereahead. Modeling of the various rows may, thus, occur simultaneously in an iterative fashion.

An exemplary implementation may involve a first process for obtaining an initial estimate of the transition location. A first step is the generation of an appropriate CFD mesh whose boundaries are defined by the airfoil under consideration and the flowpath in which the airfoil resides. The CFD mesh will not contain flow property information until a first initialization process is performed using the known or assumed upstream and downstream flow conditions. Initially, the turbulence model is turned on throughout the flowfield including the areas which might end up being within the boundary layer portions 30 and 34. The model may be run until convergence. Upon convergence, the data is analyzed. The analysis determines an initial position for the boundary layer edge. For each streamwise location along the suction side surface between leading and trailing edges, a series of parameters may be calculated and stored. The number of streamwise locations may depend on the resolution of the flowfield. These parameters include the density ρ, the velocity at the edge of the boundary layer $U_\infty$, and the viscosity μ. An integration normal to the surface to the boundary layer edge provides a value of θ and the values of u', $\lambda_x$, and Tu at the boundary layer edge may also be calculated and stored. The values of $Re_\theta$ and $Re_{\theta onset}$ may then be calculated and stored. The streamwise position where these two values are equal provides the initial estimate of the transition location.

For given operating conditions and airfoils (the size, shape, orientation and positioning/spacing of the airfoils of each row) a CFD simulation may then be run with the turbulence model shut-off in the flow region upstream of the initial target transition using the boundary determined by the fully turbulent simulation. Once run to convergence, $Re_\theta$ and $Re_{\theta onset}$ are recalculated to determine an updated transition location. Concurrently, the boundary layer edge location is updated using the results of the converged solution. The CFD simulation is then restarted using the updated target transition location and run to convergence. This process may be repeated with each updated transition location until there is convergence of such transition location. With such final convergence, the pressure distributions and total pressure/temperature changes across the airfoil row may be calculated to determine the performance (e.g., including loss characteristics) of the airfoils of each row and of the multi-row system overall.

Further iterations may be made under one or more additional operating conditions if desired. With small changes in operating conditions, one need not necessarily restart the simulation from scratch. Instead, one may start the analysis by using the flowfield parameters from a prior set of conditions and allow refinements.

Yet subsequent design iterations may be made to analyze changes in the shapes of the airfoils of the various rows (said shapes potentially differing from row-to-row). The airfoil shape changes may be realized via manual or computer-guided means (e.g., optimizer software). Using the transitional CFD methodology described in the preceding paragraphs for each airfoil, the performance characteristics of the airfoil (e.g., loss and loading) can be calculated with more fidelity than previously available. Comparisons of said airfoil geometric shapes, and their resultant performance characteristics, can be used to guide subsequent improvements to the airfoil geometric shape in an effort to produce a better performing airfoil. Again, for each set of changed airfoils, the simulation may be run across the desired range of operating conditions.

Figure 2:
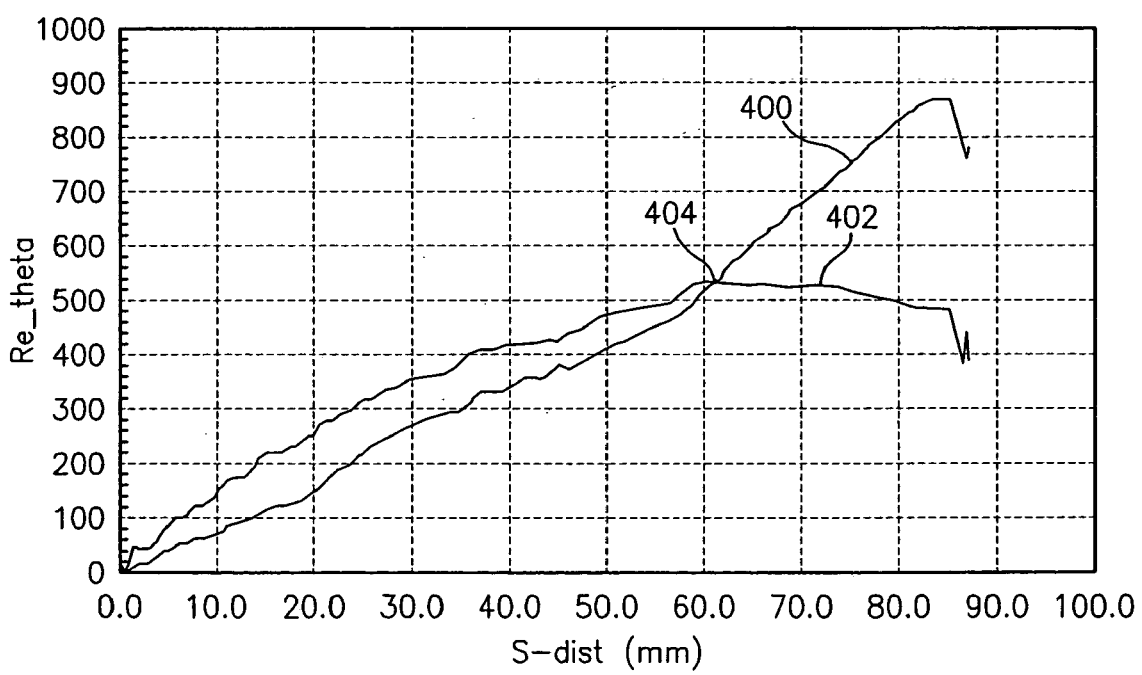
FIG. 2 is a graph showing the calculation of the onset value of momentum thickness-based Reynolds number.

For further reference, FIG. 2 shows exemplary graphs 400 and 402 of $Re_\theta$ and $Re_{\theta onset}$, respectively, against the S distance in millimeters for an exemplary airfoil under exemplary conditions. Their intersection 404 determines the streamwise position of transition.

Figure 3:
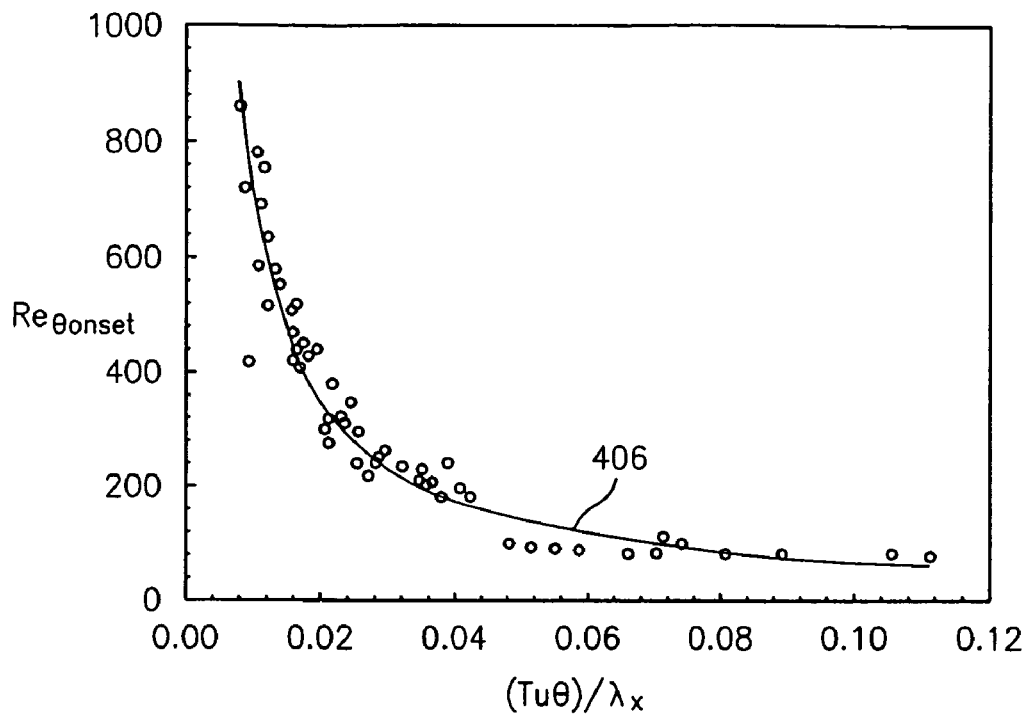
FIG. 3 is a graph of such calculated Reynolds number against a composite turbulence and momentum parameter along with experimental data points.
Figure 4:
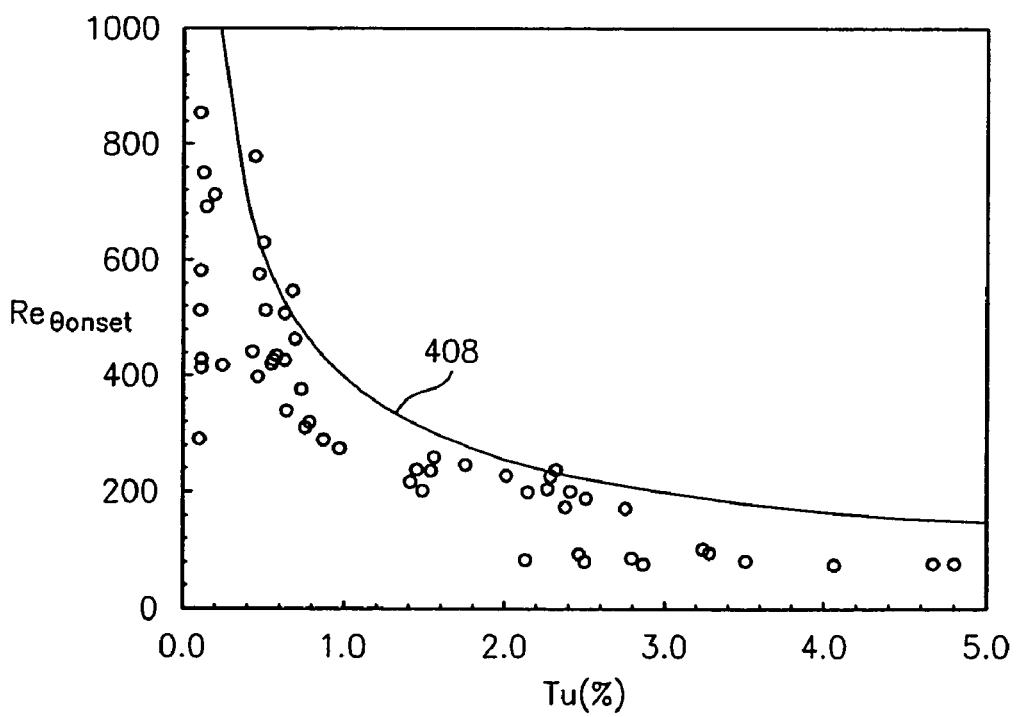
FIG. 4 is a graph of a prior art calculated Reynolds number against turbulence along with the experimental data points.

FIG. 3 shows a graph of experimentally-based values of $Re_{\theta onset}$ against $Tu\theta/\lambda_x$, with a curve 406 representing a best fit of the $Re_{\theta onset}$ model. The experimentally-based values are determined by measuring the streamwise location of onset in cascade test and then using a laminar model to find the $Re_\theta$ at such streamwise location. By way of comparison, FIG. 4 shows the values of $Re_{\theta onset}$ against Tu with a Mayle model graph 408.

One or more embodiments of the present invention have been described. Nevertheless, it will be understood that various modifications may be made without departing from the spirit and scope of the invention. For example, when applied to existing or future 2-d or 3-d CFD systems, details of the existing systems will influence or determine details of any associated implementation. Although illustrated with respect to turbomachine airfoils, other aerodynamic embodiments may be analyzed with the foregoing models. Accordingly, other embodiments are within the scope of the following claims.

What is claimed is:

1. A method for analyzing performance of a body comprising:
   determining a freestream turbulence intensity;
   determining a momentum thickness;
   determining a turbulence length scale;
   based on said freestream turbulence intensity, said momentum thickness, and said turbulence length scale, determining a first momentum thickness Reynolds number associated with a laminar/turbulent boundary transition; and
   associating said first momentum thickness Reynolds number with a location along the body.

2. The method of claim 1 wherein:
   the body comprises an airfoil having a pressure side and a suction side.

3. The method of claim 1 wherein:
   the first momentum thickness Reynolds number is essentially determined based on a function of said freestream turbulence intensity multiplied by said momentum thickness divided by said turbulence length scale.

4. The method of claim 3 wherein:
   the function is essentially an exponent multiplied by a constant.

5. The method of claim 4 wherein:
   the constant is 7.0–11.0; and
   the exponent is –(0.8–1.1).

6. A method for engineering a body comprising:
   determining a freestream turbulence intensity;
   determining a turbulence length scale;
   based on said freestream turbulence intensity and said turbulence length scale, determining a first momentum thickness Reynolds number associated with a laminar/turbulent boundary transition; and
   associating said first momentum thickness Reynolds number with a location along the body.

7. The method of claim 6 wherein:
   the location is a target laminar/turbulent transition.

8. The method of claim 6 further comprising running a computational fluid dynamics (CFD) simulation of the body with a turbulence model turned off in a boundary layer essentially upstream of the location.

9. The method of claim 8 iteratively performed on successive versions of said body with associated variations in shape so as to optimize a performance parameter of such body.

10. The method of claim 8 wherein:
    the body comprises an airfoil having a pressure side and a suction side.

* * * * *